United States Patent [19]

Nomura et al.

[11] 4,313,074

[45] Jan. 26, 1982

[54] SERVO CONTROL SYSTEM OPERABLE ON DIGITAL BASIS

[75] Inventors: Tadashi Nomura; Hiroshi Inada; Keizo Morita; Akio Watanabe; Kiyoaki Nishikawa, all of Tokyo, Japan

[73] Assignee: Nippon Electric Co., Ltd., Tokyo, Japan

[21] Appl. No.: 144,131

[22] Filed: Apr. 28, 1980

[30] Foreign Application Priority Data

Apr. 27, 1979 [JP] Japan ................................ 54/52694
Dec. 14, 1979 [JP] Japan ............................... 54/163266

[51] Int. Cl.³ ............................................. G05B 1/01
[52] U.S. Cl. .................................... 318/608; 318/603
[58] Field of Search ............................... 318/603, 608

[56] References Cited

U.S. PATENT DOCUMENTS

3,519,904  7/1970  Rogers ............................ 318/608
3,728,607  4/1973  Isak ................................. 318/608
3,954,163  5/1976  Gabor ........................... 318/603 X
4,226,546 10/1980  Hoffman ....................... 318/603 X Primary Examiner—B. Dobeck
Attorney, Agent, or Firm—Sughrue, Mion, Zinn, Macpeak and Seas

[57] ABSTRACT

A digital servo control system is responsive to a command signal indicative of a command position of a moveable element and to a phase modulated signal corresponding to the angle of rotation of a motor controlling said moveable element to develop a motor drive signal to position the motor. The system provides control during a velocity control mode and a position control mode, the latter occurring after the moveable element is moved to a predetermined small incremental distance from the commanded position. During the velocity control mode the motor is driven in accordance with a reference velocity selected in dependence upon the position error signal. Following a prescribed time after entry into the position control mode, the position error has added thereto an integration signal which increases in the same sense as the position error.

7 Claims, 30 Drawing Figures

400c REF CLOCK PULSE

451a MSB

SERVO CONTROL SYSTEM OPERABLE ON DIGITAL BASIS

BACKGROUND OF THE INVENTION

This invention relates to a servo control system responsive in general to a sequence of position commands supplied from an external source for intermittently and controllably driving a motor, with rotation of the motor fed back, to position a movable element at successively commanded positions substantially at rest. More particularly, this invention relates to a digital servo control system for use in a position control or positioning control system for either a carriage of a serial printer of the type known as an impact type in the art or a type wheel, drum, or cylinder carried by the carriage.

As will be described later with reference to a few of various figures of the accompanying drawing, an impact type serial printer is for use in combination with an electronic digital computer and comprises a carriage, a carriage motor for linearly moving the carriage along a predetermined path in either of two senses along the path, and a position control system for controllably driving the motor so as to successively and intermittently position the carriage at rest at positions commanded by the computer along the path. A rotary type wheel carrying a plurality of type elements is mounted on the carriage together with a type wheel motor for rotating the type wheel in either of two senses of rotation. A similar position control system controllably drives the wheel motor so as to intermittently position the wheel at rest at desired angular or rotational positions commanded also by the computer. Successively selected type elements are thereby placed at a common printing position predetermined relative to the carriage.

A position control system for controllably positioning a movable element, such as the carriage or the type wheel mentioned above, to a commanded position comprises an increment encoder or position transducer mechanically or otherwise coupled to a motor for the element. It is already known in the art to make the encoder produce a pair of incremental position signals having polarities that vary with a phase difference therebetween in response to every predetermined incremental angle of rotation of the motor. The successive variations in the polarity therefore correspond to a variation in the present or instantaneous angular position of the motor and hence the present linear or angular position of the movable element. The phase difference indicates one of a plus or positive and a minus or negative sense in which the present position is varying. The rate at which the polarities vary is proportional to a present angular velocity of the motor and accordingly the present linear or angular velocity of the element. The position signals are subtracted from the commanded signal to provide a position error between the present and the commanded positions. The motor is controlled so as to reduce the position error to zero.

In U.S. Pat. No. 3,954,163 issued to Andrew Gabor, a position control system for an impact serial printer is disclosed wherein either of a motor for a carriage and another motor for a rotary print wheel is controllably driven at first in a velocity control mode and then in a position control mode on moving the movable element intermittently from each commanded position to a next following commanded position. In the velocity control mode, the motor is driven to follow a reference angular velocity selected in consideration of the position error and represented by an analog reference velocity signal. This mode of operation is continued until the element is driven from a commanded position to a point spaced a predetermined length from the next following commanded position. In the position control mode, the motor is driven at a velocity related to an analog position error signal representative of the position error to eventually position the element at rest at next following commanded position.

The use of analog signals in a servo control system used in such a position control system makes it difficult to achieve expectedly excellent results in operation and maintenance. Furthermore, it is rendered difficult to provide a compact servo control system. This means that the servo control system becomes bulky and expensive.

Shigeru Shimonou, Hiroshi Inada and Tadashi Nomura, assignors to the instant assignee, of whom Hiroshi Inada and Tadashi Nomura are the present joint inventors, have previously proposed position control systems in copending U.S. Pat. application Serial Nos. 911,263 and 46,294 filed May 31, 1978 and June 7, 1979, respectively, now U.S. Pat. Nos. 4,216,415 (Aug. 5, 1980) and 4,259,626 (Mar. 31, 1981), respectively. It was believed that servo control systems used in the previously proposed position control systems were much improved in these respects and, in fact, really are. The previous servo systems, however, are not suitable to position a movable element with very high precision due to use of a photo-encoder as means for producing a position signal, which comprises a rotatable opaque disk connected to the movable element and having azimuthally spaced radial slits or position information pattern, a light source for illuminating the radial slits, and an optical sensor. For positioning with very high precision, the space of the radial slits must be so sufficiently narrowed as to cause the position signal to follow a minute displacement of the movable element. The narrowing in the slit space requires a very high delicate technology for manufacturing the disk, or a large-sized disk. The use of such disk in a photo-encoder causes it to become bulky. The bulky photo-encoder makes it difficult to achieve positioning with very high precision. This means that the servo control system for positioning with very high precision becomes expensive.

SUMMARY OF THE INVENTION

It is therefore an object of the present invention to provide a servo control system in which a compact position sensor can be used for producing a position signal in accordance with a minute displacement of a movable element.

It is another object of this invention to provide a servo control system of the type described, which is operable at high speed and with very high precision.

It is still another object of this invention to provide a servo control system of the type described, which is simple in structure, compact, and inexpensive.

It is possible to manufacture essential parts of a servo control system according to this invention as an integrated circuit.

A digital servo control system to which this invention is applicable is responsive to a command signal indicative of a commanded position of a movable element and a phase-modulated position signal having a phase responsive to a predetermined incremental angle of rotation of a motor rotatable with a variable angular velocity to vary the present position of the element, for producing a motor drive signal for controllably driving the motor to position the element at the commanded position. The angular velocity has either of two senses at a time. The 90°-phased sinusoidal waves are applied as sensor drive signal to a position sensor for producing the position signal. The system comprises incremental position pulse producing means responsive to the phase-modulated position signal for producing incremental position pulses representative of a variation in the current position. The system comprises control signal producing means responsive to the command signal and the position pulses for calculating a displacement from the current position to the commanded position and for producing a control signal digitally representative of a reference angular velocity selected for the motor in consideration of the displacement until an instant at which the displacement is reduced in absolute value to a predetermined value, a first positional error determined by the displacement during a prescribed interval of time following the above-mentioned instant, and a second position error having a value increasing in absolute value with relation to the displacement when a predetermined interval of time lapses after the above-mentioned instant. The prescribed interval is not longer in duration than the predetermined interval. The movable element is positioned substantially at the commanded position within the predetermined interval. The system further comprises motor drive signal producing means responsive to the control signal and the position pulses for producing the motor drive signal.

DESCRIPTION OF THE PREFERRED EMBODIMENTS

It is to be noted at outset that signals and lines for transmitting the respective signals are often designated by the same reference characters in the following description.

Figure 1:
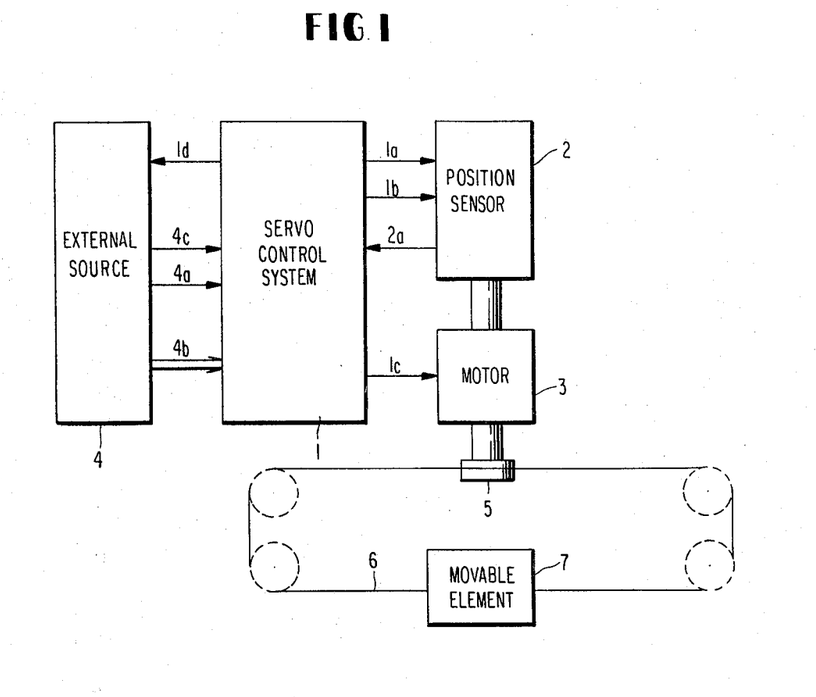
FIG. 1 illustrates in blocks a servo control system to which the instant invention is applicable, together with a movable element, a motor, a command signal generator, and a position sensor.

Referring to FIG. 1, a servo control system to which the present invention is applicable is for use in a position control system accompanied by a movable element 7, such as a carriage of a serial printer of the impact type, and a motor 3 for controllably driving an axle of a shaft thereof with a variable angular velocity. Merely for convenience of illustration, the axle is depicted as passing through the motor 3. The axle is coupled to the element 7 by means of a driving pulley 5 fixed to the axle and a wire or belt 6 is driven by the driving pulley 5. The motor 3 thus controllably varies the present or instantaneous position of the element 7. The position control system is for use in combination also with a command signal generator or external source 4, such as an electronic digital computer, for producing a digital command signal indicative in general of successively commanded positions of the element 7. It is possible to assume without loss of generality that the motor axle is kept in a predetermined direction. The "angular velocity" as called herein is therefore specified only by its magnitude and sense. It is to be remembered furthermore that the expressions are used herein such that the "motor" 3 is rotatable in one or the other sense at a time and the like.

Further referring to FIG. 1, the position control system comprises a servo control system 1 and a position sensor or position transducer 2, which is supplied with sensor driving signals 1a and 1b and mechanically or otherwise coupled to the motor 3 to produce position signal 2a and supplies the same to the servo control system 1. The command signal for each commanded position or end point is produced by the command signal generator 4 in response to a new-data request signal 1d supplied thereto from the servo control system 1 in the manner described later and consists of a sense signal 4a and a distance signal 4b, which are supplied to the servo control system 1. The distance signal 4b is usually representative of a distance of the end point from the next previous commanded position or start point and consists of a predetermined number of bits, such as eleven bits. The sense signal 4a indicates one of a plus or positive and minus or negative sense, such as counter-clockwise and clockwise senses, of rotation of the motor 3 and may be an additional bit, such a a twelfth bit, of the command signal 4a-4b. The command signal 4a-4b is set in the servo control system 1 by a set signal 4c supplied from the command signal generator 4. Responsive to the command signal 4a-4b and the position signal 2a, the servo control system 1 supplies a motor drive signal 1c to the motor to make the same move the movable element 7 eventually to the end point as will be described hereunder.

Figure 2:
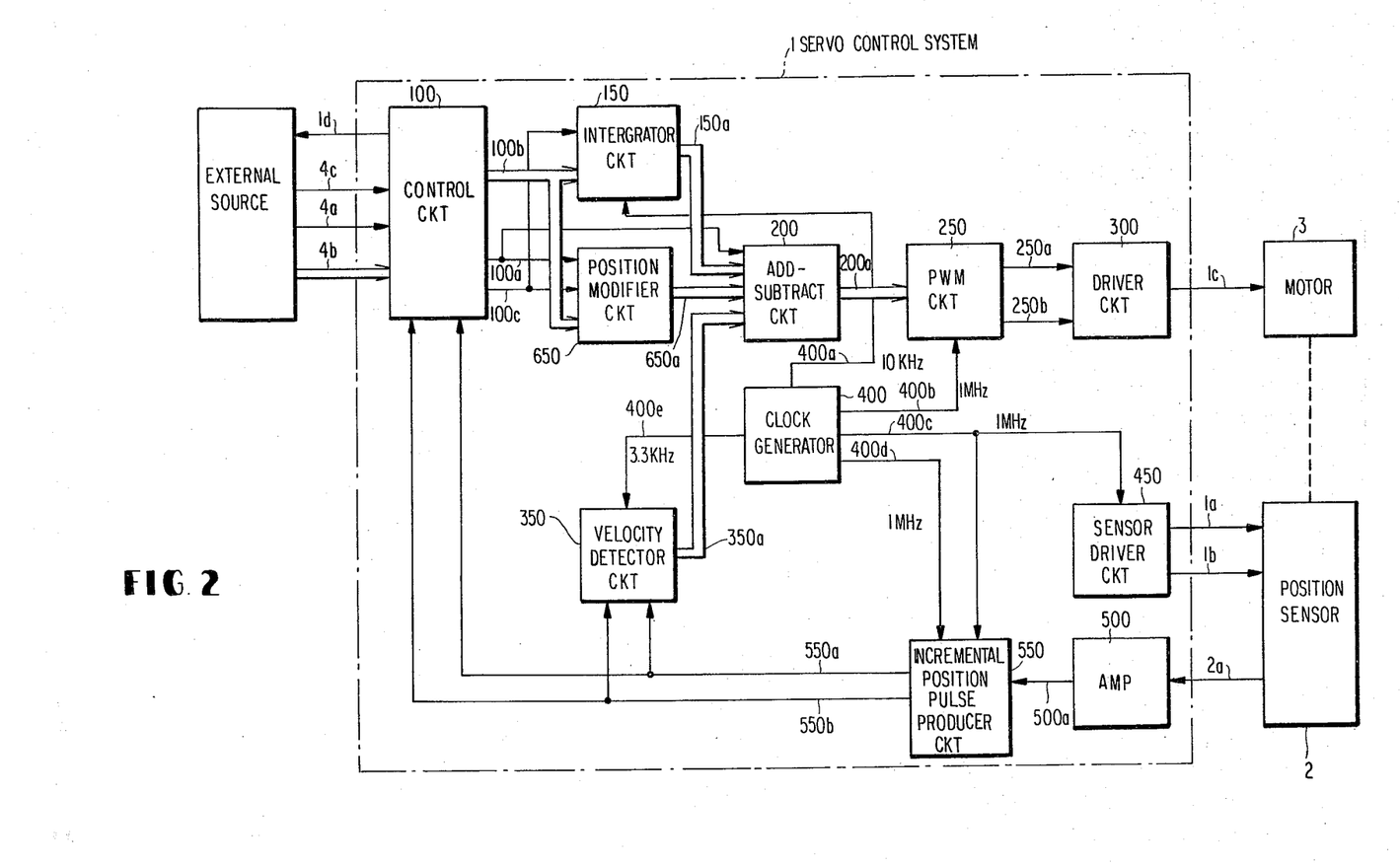
FIG. 2 is a block diagram showing a servo control system according to a first embodiment of this invention, together with the motor, the command signal generator, and the position sensor.

Referring to FIG. 2, a servo control system 1 according to a first embodiment of this invention comprises a clock generator circuit 400 for generating several clock pulse sequences, such as an integration clock pulse sequence 400a, a pulse width modulation (PWM) clock pulse sequence 400b, a pair of reference pulse sequences 400c and 400d, and a sampling clock pulse sequence 400e. The repetition frequencies or clock rates of the respective clock pulse sequences 400a through 400e will be exemplified later. Let it now be presumed that the sense signal 4a indicates the positive sense of rotation of the motor 3. When produced, the sense and the distance signals 4a and 4b are stored in a control circuit 100 in response to the set signal 4c. The control circuit 100 produces a mode signal 100a that indicates at first the velocity control mode described in the preamble of the instant specification. The control circuit 100 produces also a digital control signal 100b repesentative of one of a plurality of reference angular velocities predetermined for the motor 3 that is selected in consideration of the position error, mentioned also hereinabove, now given by the distance signal 4b by itself. The control signal 100b is supplied to a position modifier circuit 650 and an integrator circuit 150, of which the latter circuit 150 is primarilly for integrating the integration clock pulse 400a. The integrator circuit 150, however, keeps an integrator output signal 150a thereof at zero in the velocity control mode rather than actually carrying out the integration. The position modifier circuit 650, responsive to the mode signal 100a indicative of the velocity control mode, supplies the control signal 100b as it is through a line 650a to an add-subtractor circuit 200. The add-substractor circuit 200 produces an algebraic sum signal 200a that is representative at present of the selected reference angular velocity as will become clear as the description proceeds. By the use of the PWM clock pulse 400b, a pulse width modultor (PWM) circuit 250 carries out pulse width modulation of the algebraic sum signal 200a to deliver a modulator output signal alternatingly to two modulator output leads 250a and 250b. The signals supplied to the individual leads 250a and 250b will herein be called a positive and a negative output signal, respectively. Supplied with the positive and the negative output signals 250a and 250b, a driver circuit 300 makes the motor drive signal 1c drive the motor 3 in the positive sense with its present angular velocity increased towards the selected reference angular velocity.

As soon as the motor 3 begins to rotate in the positive sense, the position sensor 2, which is supplied from a sensor driver circuit 450 with the sensor driving signals 1a and 1b of sinusoidal waves having a first repetition period and different phases from each other by 90°, produces the position signal 2a. The position signal 2a is supplied to an amplifier 500 to provide a digital position signal 500a. The digital position signal 500a is supplied to an incremental position pulse producer circuit 550, which is supplied with first and second reference clock pulse sequences 400c and 400d and produces a sequence of plus or positive position pulses 550a. The position pulse producer circuit 550 produces pulses of a minus or negative position pulse sequence 550b when the motor 3 is rotating in the negative sense. Responsive to the positive position pulses 550a and the sampling clock pulse sequence 400e, a velocity detector circuit 350 produces a velocity signal 350a, representative of the present angular velocity. In the control circuit 100, the pulses of the positive position pulse sequence 550a are subtracted from the distance signal 4b. The difference represents the position error. It is possible to understand that the calculation is for deriving a displacement from the present position of the motor 3 or the movable element 7 to the commanded position thereof. Inasmuch as the displacement has a predetermined direction, the displacement is defined by a magnitude and either of a positive or negative sense. The magnitude is given by the difference. As will become clear as the description proceeds, the sense is given by the sense signal 4a for the time being. With reference to the position error, the reference angular velocity is stepwise reduced in general. In the meantime, the velocity signal 350a is subtracted in the add-subtractor circuit 200 from the reference angular velocity to make the present angular velocity of the motor 3 follow the reference angular velocity. The velocity detector circuit 350 and the add-subtractor circuit 200 thus provide velocity feedback.

When the displacement calculated in the control circuit 100 decreases in absolute value to a predetermined value, the mode signal 100a begins to indicate the position control mode. The digital control signal 100b now represents the position error instead of the reference angular velocity. As will become clear later, the position error has either a positive or a negative sign in the position control mode. The sense of displacement is given by the sign. The integrator circuit 150 does not yet carry out the integration. The velocity detector circuit 350 and the add-subtractor circuit 200 provide velocity feedback, which now serves as damping. The integrator circuit 150 begins to carry out the integration a predetermined interval of time after an instant at which the mode signal 100a is switched to indicate the position control mode for suppressing the limit cycle as will presently become clear. It may be mentioned here that the motor 3 is driven within the predetermined interval substantially to the commanded position. The predetermined interval may, for example, be several milliseconds long.

Figure 3:
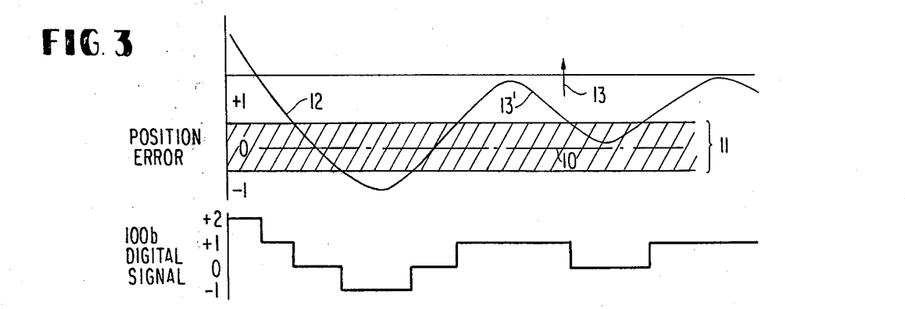
FIG. 3 is a graph showing a few signals for describing the limit cycle that appears in a general digital servo control system.

Turning to FIG. 3, let it be surmised that the movable element 7 and consequently the motor 3 should be positioned at a commanded position 10 shown in the top row of the figure. Because of the digital operation, the position sensor 2 specifies the commanded position 10 as a dead band or zone 11 having a width inversely proportional to the number of the positive or the negative position pulses 550a or 550b produced by the position pulse producer circuit 550 per one complete rotation of the motor. When the position error decreases as exemplified in the left end portion of the top row at 12, the motor 3 is decelerated towards a stop. The velocity signal 350a is very small. The digital control signal 100b representative of the position error of the values +2 and +1 is therefore successively fed back in approximation to the motor 3. When the postion error is further reduced into the dead zone 11, the motor 3 receives no force from the servo control system 1. Due to the inertia, the position error becomes −1 and then tends to transiently oscillate between +1 and −1 before the motor 3 is positioned eventually at rest at the commanded position 10. If an external force is applied to the motor 3 during the transient oscillatory rotation thereof in, for example, the positive sense indicated at 13 from the motor brushes (not shown) and/or the movable element driving mechanism comprising the wire 6, the transient oscillation lasts for a relatively long time at least between +1 and 0 as depicted at 13′ with a peak-to-peak value approximately equal to two in terms of the number of pulses of the positive or the negative position pulses 550a or 550b. This phenomenon called the limit cycle and gives rise to unpleasant noise.

Figure 4:
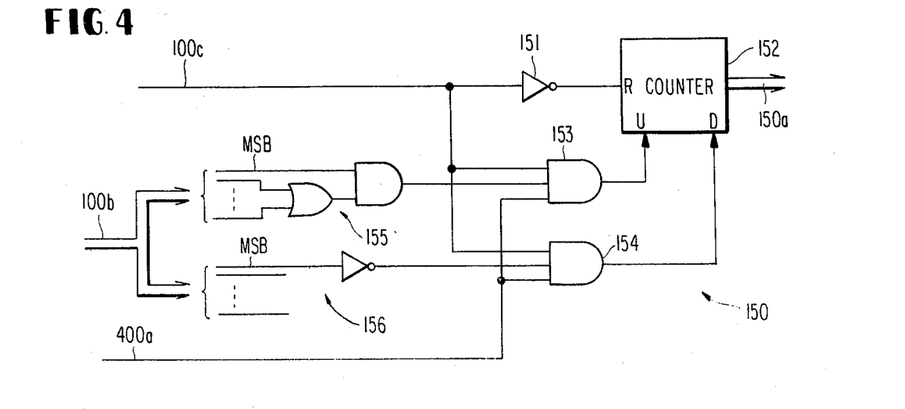
FIG. 4 is a block diagram of an integrator circuit used in the system depicted in FIG. 2.

Referring now to FIG. 4, an example of the integrator circuit 150 is supplied with the stop signal 100c, which is switched from a logic "0" level to a logic "1" level a predetermined interval of time after the instant at which the mode signal 100a is switched to indicate the position control mode, i.e., from the logic "0" level to the logic "1" level. The stop signal 100c of logic "0" is supplied through an inverter 151 to a reset input terminal R of an integration counter 152 as a logic "1" signal and directly to one input each of first and second three-input AND gates 153 and 154 during the time that the mode signal 100a indicates the velocity control mode and during the predetermined time interval. In the meantime, the counter 152 is kept in the reset state to maintain the integrator output signal 105a zero.

In FIG. 4, a first detector 155 supplies a logic "1" signal to a second input of the first AND gate 153 in response to the digital control signal 100b when the signal 100b represents a number equal to +1 or greater. Likewise, a second detector 156 delivers a logic "1" signal to a second input of the second AND gate 154 when the digital control signal 100b is representative of a number equal to −1 or less. The AND gates 153 and 154 are thus enabled, in the position control mode, when the position error is equal to +1 or greater and equal to −1 or less, respectively. The integration clock pulses 400a are supplied to a third input each of the AND gates 153 and 154. When put into operation after the lapse of the predetermined interval, the counter 152 counts up and down the integration clock pulses 400a supplied to count up and down terminals U and D thereof through the enabled first and second AND gates 153 and 154, respectively, to give the integrator output signal 150a an increasing or decreasing value rather than zero. Let the most significant bit (MSB) of the digital control signal 100b serve as a sign bit for indicating the sign of the position error in the position control mode. The first detector 155 may comprise an AND gate responsive to the most significant bit of the digital control signal 100b and an OR'ed output of the signal 100b except the most significant bit. The second detector 156 may comprise an inverter for the most significant bit. The integrator circuit 150 thus carries out integration of the position error in the sense or sign that the position error has.

Figure 5:
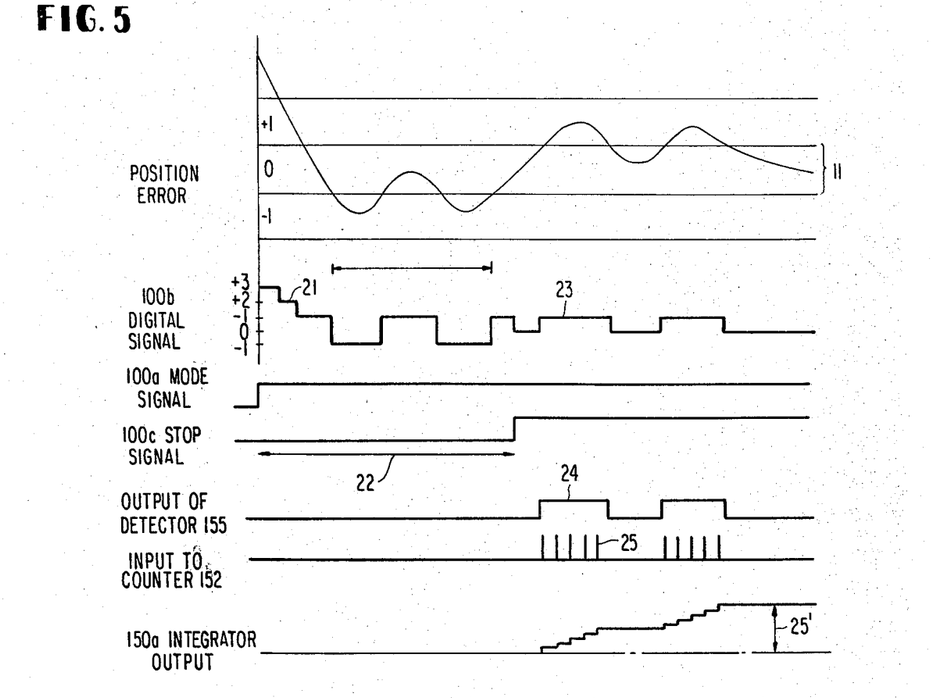
FIG. 5 is a timing chart diagrammatically showing several signals for describing the operation of the integrator circuit shown in FIG. 4.

Referring to FIG. 5, it is now presumed that the servo control system 1 is switched from the velocity control mode to the position control mode when the absolute value of the displacement decrease from four to three. The digital control signal 100b now indicates the position error that decrease as depicted at 21 along the top row. The mode signal 100a is switched from the logic "0" level to the logic "1" level as shown in the next row. When a predetermined interval of time 22 lapses after the mode signal 100a is switched to the logic "1" level, the stop signal 100c is switched to a logic "1" level. In the meantime, the position error is reduced to zero. The limit cycle, however, appears as depicted at 23 in the top row. The first detector 155 intermittently produces logic "1" signals 24 to enable the first three-input AND gate 153. The integration clock pulses 400a therefore supplied to the count up terminal U of the integration counter 152 as shown at 25. The integrator output signal 150a is thus given a stepwise rising level. The limit cycle is suppressed when the external force is balanced by the torque produced by the motor 3 in response to the integrator output signal 150a of a certain level exemplified at 25′. It is thereby possible to position the movable element 7 quickly at the commanded position 10.

Figure 6:
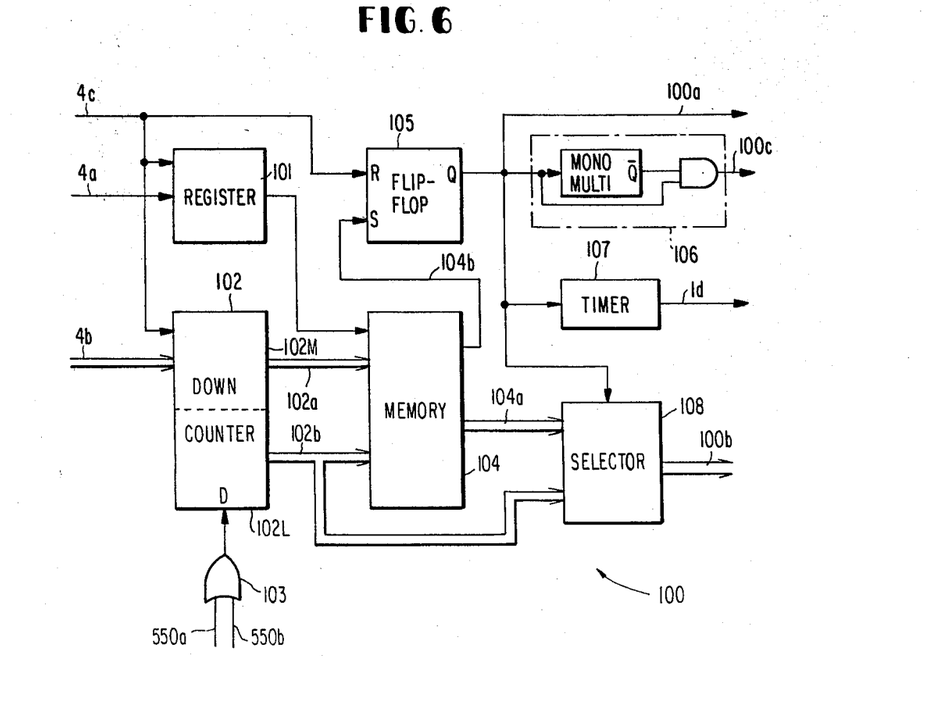
FIG. 6 is a block diagram of a control circuit used in the system illustrated in FIG. 2.

Turning to FIG. 6, an example of the control circuit 100 is supplied with the sense signal 4a, the distance signal 4b and the set signal 4c from the command signal generator 4 in the velocity control mode. Responsive to the set signal 4c, the sense signal 4a and the distance signal 4b are set in a register 101 and one portion 102M (more-significant-bit parts) of a down counter 102 as an initial count, respectively. The down counter 102, which is supplied with the incremental position pulses 550a and 550b through an OR gate 103, counts down the initial count to produce first and second position error signals 102a and 102b. A combination of the sense signal 4a and the first and second position error signals 102a and 102b is used to specify an address of a memory 104 in which are stored several reference angular velocity signals. Addressed by these signals 4a, 102a and 102b, the memory 104 supplies a line 104a with a selected one of the reference velocity signals. When the distance signal 4b is an eleven-bit signal, i.e., the portion 102M of the down counter 102 is composed of an eleven-bit counter, the other portion 102L (less-significant-bit parts) of the down counter 102 is preferably a three-bit counter that produces the second position error signal 102b representative in the position control mode of the magnitude of the displacement in terms of the number of the positive or the negative position pulses 550a or 550b. In other words, the bit-number (n) of the portion 102L is so selected that the dividing rate ($2^n$) is equal to the pulse-number of the position pulses 550a and 550b corresponding to the least moving distance of the movable element 7. As a result, the first position error signal 102a represents the magnitude of the displacement in terms of the unit for the least moving distance, and the second position error signal 102b represents the displacement in a range of the least moving distance.

In FIG. 6, the set signal 4c is supplied to a reset terminal R of a flip-flop circuit 105, which is also supplied at a set terminal S with a zero-detect signal 104b produced by the memory 104 when the first position signal 102a represents zero, to make the mode signal 100a indicate the velocity and the position control modes by a logic "0" (low) and a logic "1" (high) level, respectively. A first timer 106 composed of a monostable multivibrator 1061 and an AND gate 1062 produces the stop signal 100c a predetermined interval of time 22 (FIG. 5) after the instant at which the mode signal 100a is switched from the logic "0" level (velocity control mode) to the logic "1" level (position control mode). A second timer 107 identical to the first timer 106 except for the time constant for the monostable multivibrator produces the new-data request signal 1d a prescribed interval of time after the above-mentioned instant. Supplied with the mode signal 100a indicative of the velocity control mode, a selector 108 produces the reference angular signal as the digital control signal 100b. When the mode signal 100a indicates the position control mode, the selector 108 produces the second position error signal 102b as the digital control signal 100b.

Figure 7:
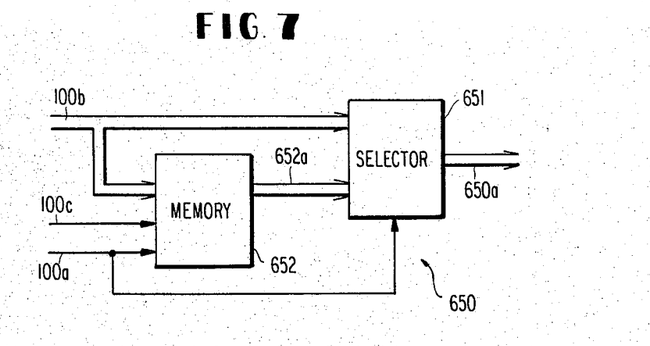
FIG. 7 is a block diagram of a position modifier circuit used in the system illustrated in FIG. 2.
Figure 7A:
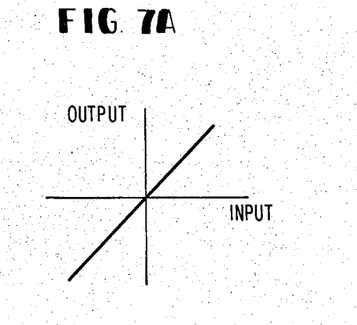
FIGS. 7A and 7B are graphs showing several signals for describing the operation of the position modifier circuit shown in FIG. 7.
Figure 7B:
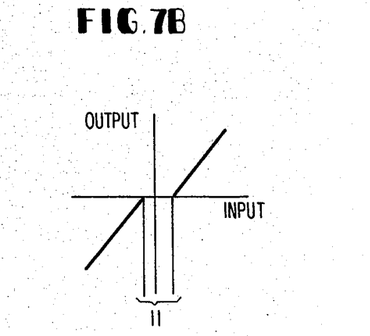

Referring to FIG. 7, an example of the position modifier circuit 650 comprises a selector 651, which is supplied with the mode signal 100a and the digital control signal 100b. When the mode signal 100a indicates the velocity control mode, the selector 651 produces the digital control signal 100b at the line 650a. When the mode signal 100a is switched to indicate the position control mode, the selector 651 supplies an output signal 652a supplied from a memory 652, which is supplied with the mode signal 100a, the digital control signal 100b and the stop signal 100c as address data thereof. Addressed by these signals 100a, 100b and 100c, the memory 652 supplies a first and a second modified signals as depicted in FIGS. 7A and 7B when the stop signal 100c is logic "0" level and logic "1" level, respectively. In other words, the first modified position signal having no dead zone is supplied from the memory 652 through the selector 651 to the line 650a during the predetermined interval of time 22 (FIG. 5). When the stop signal 100c is switched from the logic "0" level to the logic "1" level, the memory 652 supplies the line 652a the second modified position signal having the dead zone 11, which is passed through the selector 651 to the line 650a.

Figures 8, 9:
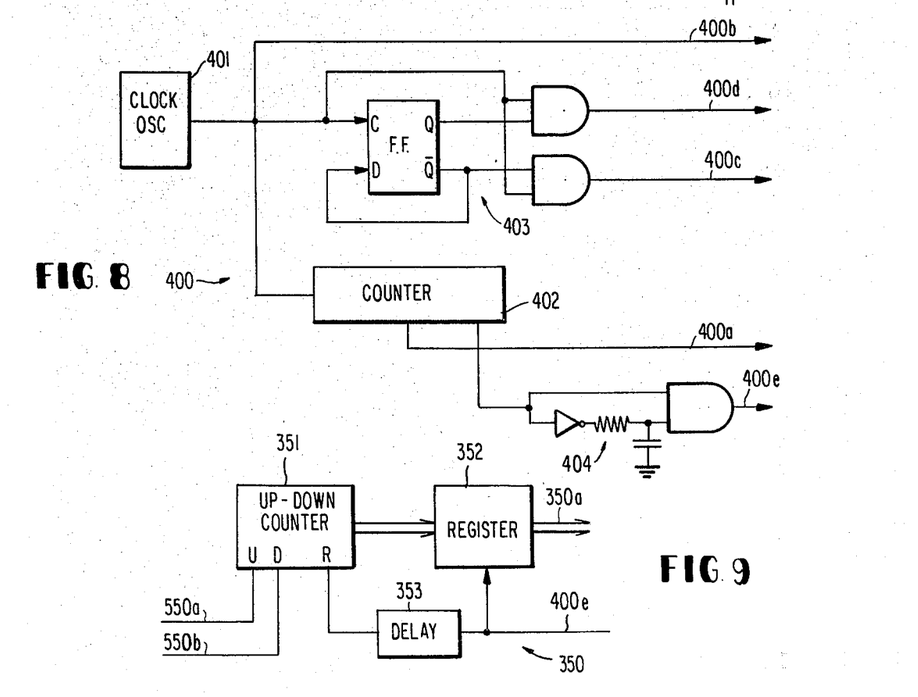
FIG. 8 is a block diagram of a clock generator circuit used in the system shown in FIG. 2.
FIG. 9 is a block diagram of a velocity detector circuit used in the system illustrated in FIG. 2.

Turning to FIG. 8, the clock generator circuit 400 preferably comprises a standard clock generator 401 for generating a standard clock pulse sequence at a sufficiently highclock rate. A counter 402 frequency divides the standard clock pulse sequence to provide the integration clock pulse sequence 400a. The standard clock pulse sequence is used as the PWM clock pulse sequence 400b. The standard clock pulse sequence is supplied to a reference clock pulse producer 403 composed of a flip-flop circuit and two AND gates to provide the first and second reference clock pulse sequences 400c and 400d. The counter 402 further frequency divides the standard clock pulse sequence to provide a low-rate clock pulse sequence, which is shaped by a shaping circuit 404 into the sampling clock pulse sequence 400e. By way of example, the clock rate of the standard clock pulse sequence and accordingly the PWM and the reference clock pulse sequences 400b through 400c is 1 MHz. Those of the integration and the sampling clock pulse sequences 400a and 400e are 10 KHz and 3.3 KHz, respectively. Referring to FIG. 9, an example of the velocity detector circuit 350 comprises an up-down counter 351 for counting up and down the positive and negative position pulses 550a and 550b, respectively, to deliver a count signal to a register 352. The sampling clock pulses 400e are supplied to a set input terminal S of the register 352 directly and to a reset input terminal R of the counter 351 through a delay circuit 353. When each of the sampling clock pulses 400e appears, the count signal is set or registered in the register 352 to be produced therefrom as the velocity signal 350a. Immediately thereafter, the counter 351 is reset. The velocity signal 350a thus represents the number of the positive or negative position pulses 550a or 550b produced by the position pulse producer circuit 550 within an interval of time determined by the sampling clock pulse sequence 400e.

Figure 10:
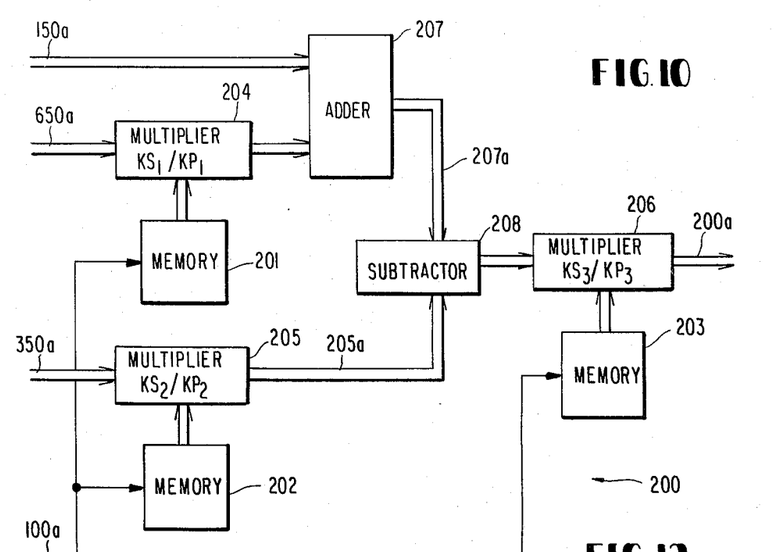
FIG. 10 is a block diagram of an add-subtractor circuit used in the system depicted in FIG. 2.

Referring to FIG. 10, an example of the add-subtractor circuit 200 comprises memories 201, 202 and 203 for producing multiplying factors $KS_1$ and $KP_1$, $KS_2$ and $KP_2$, and $KS_3$ and $KP_3$ in response to the mode signal 100a indicative of the velocity control mode and the position control mode, respectively. These factors are supplied to multipliers 204, 205 and 206. The multiplier 204 multiplies the reference angular velocity signal and the position error signal supplied through the line 650a by the factors $KS_1$ and $KP_1$ in the velocity and the position control modes, respectively. An adder 207 adds the integration output signal 150a to the multiplied signal derived from the multiplier 204. The multiplier 205 multiplies the velocity signal 350a by the factors $KS_2$ and $KP_2$ in the velocity and the position control modes, respectively. A subtractor 208 subtracts the multiplied velocity signal 205a of the multiplier 205 from an output signal 207a of the adder 207. An output signal 208a of the subtractor 208 is supplied to the multiplier 206 and multiplied by the factors $KS_3$ and $KP_3$ in the velocity and the position control modes, respectively, to provide the algebraic sum signal 200a.

Because the integrator output signal 150a is maintained at zero when the stop signal is the logic "0" level, the multiplied signal 204a from the multiplier 204 is supplied to the subtractor 208 as it is. Therefore, during the time interval of the velocity control mode and the predetermined time interval 22, i.e., during time that the stop signal is the logic "0" level, the velocity signal is subtracted from the reference angular velocity signal or the position error signal. During the time interval of the position control mode except for the time interval 22, the position error signal is added to the integration output signal and the velocity signal is subtracted from the added signal.

Figure 11:
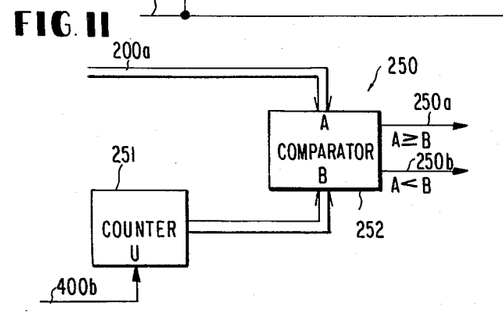
FIG. 11 is a block diagram of a pulse width modulator circuit used in the system shown in FIG. 2.

Referring to FIG. 11, an example of the PWM circuit 250 comprises a counter 251 for counting the PWM clock pulses 400b. The count signal derived from the counter 251 serrasoisally oscillates with a count cycle between zero count and the full count. The count cycle is selected so that the repetition frequency of the serrasoidal oscillation may be, for example, 20 KHz. It is readily possible to make the count signal vary between negative and positive values having a substantially equal absolute value. A comparator 252 compares the algebraic sum signal 200a supplied to a signal input terminal A thereof with the oscillating count signal supplied to a reference input terminal B. When the algebraic sum signal 200a is not less than and is less than the oscillating count signal, the comparator 252 gives the logic "1" (high) level to the positive and the negative output signals 250a and 250b, respectively. The comparator 252 thus gives the logic "1" level to each of the positive and the negative output signals 250a and 250b once in each count cycle of the counter 251. When the algebraic sum signal 200a has a positive level, the duration of the high level of the positive output signal 250a is longer in proportion to the positive level than the duration during which the negative output signal 250b is given the high level. The leads 250a and 250b are thus supplied with a pulse width modulated signal having a pulse width variable in proportion to the algebraic sum signal 200a.

Figure 12:
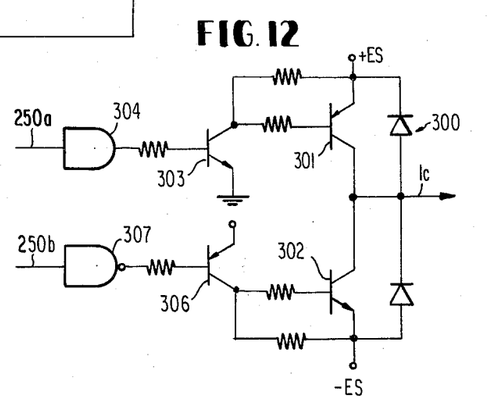
FIG. 12 is a block diagram of a driver circuit used in the system illustrated in FIG. 2.

Referring to FIG. 12, an example of the driver circuit 300 comprises first and second driving transistors 301 and 302 connected in series at a point of connection between positive and negative power supply terminals +ES and −ES. The positive output signal 250a is delivered to an NPN transistor 303 through a gate 304. The negative output signal 250b is supplied to a PNP transistor 306 through an inverter gate 307. When the positive output signal 250a is given the high level, the NPN and the PNP transistors 303 and 306 are rendered conductive and nonconductive, respectively, to turn the first and the second driving transistors 301 and 302 on and off, respectively. As a result, the point of connection is given a power of a voltage approximately equal to the positive power supply voltage +ES. When the negative output signal 250b is rendered high, the point of connection is given a power of a voltage nearly equal to the negative power supply voltage −ES. The power derived at the point of connection thus has an average voltage proportional to the algebraic sum signal 200a and is used as the motor drive signal 1c. It should be noted that the motor 3 has an electrical time constant that gives rise to a low-pass phenomenon and defines cutoff frequency. With the clock rate of the PWM clock pulses 400b selected sufficiently higher than the cutoff frequency as exemplified above, it is possible to render the electric current supplied to the motor 3 proportional to the algebraic sum signal 200a.

Figure 13:
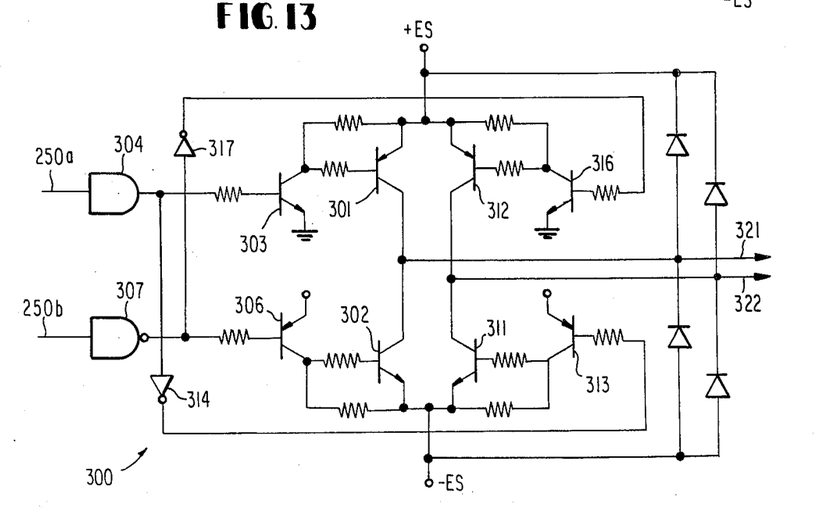
FIG. 13 is a block diagram of another driver circuit for use in the system shown in FIG. 2.

Referring to FIG. 13, another example of the driver circuit 300 is operable in a push-pull fashion and comprises first and second additional driving transistors 311 and 312 connected in series at a second point of connection between the negative and the positive power supply terminals −ES and +ES, in addition to the elements described with reference to FIG. 12 and designated herein by like reference numerals. The positive output signal 250a is supplied to an additional PNP transistor 313 through the gate 304 and an inverter 314. The negative output signal 250b is supplied to an additional transistor 316 through the inverter gate 307 and another inverter 317. When the positive output signal 250a is given the high level, the first driving transistors 301 and 311 are rendered conductive with the second driving transistors 302 and 312 turned off. The motor drive signal 1c thereby produced between connection 321 and 322 connected to the afore-mentioned point of connection and the second point of connection, respectively, has a voltage nearly equal to +2ES. When the negative output signal 250b is rendered high, the motor drive signal 1c has a voltage near −2ES. The illustrated driver circuit 300 is therefore capable of raising the gain of the servo control system 1 and thereby improving the control characteristics thereof.

Figure 14:
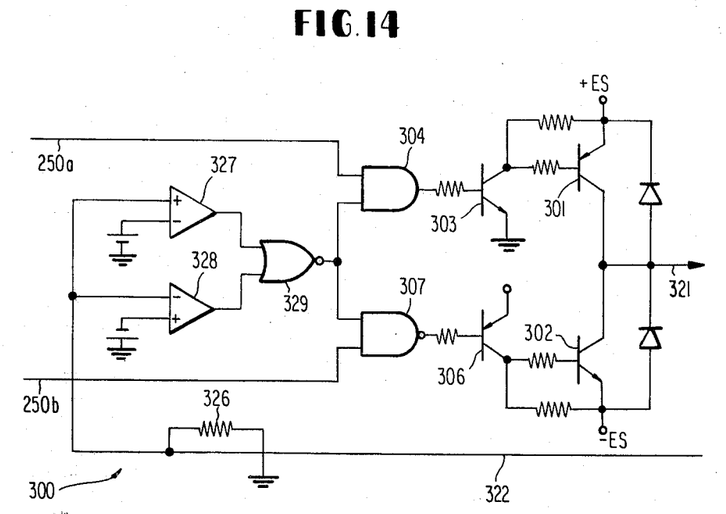
FIG. 14 is a block diagram of still another driver circuit for use in the system shown in FIG. 2.

Referring to FIG. 14, still another example of the driver circuit 300 is specifically adapted to a motor 3 that is subject to demagnetization when the motor drive current exceeds a certain limit. The illustrated circuit 300 comprises similar parts designated again by like reference numerals as in FIG. 12 and, in addition thereto, a resistor 326 interposed between the connection 322 serving as a return conductor for the motor drive current and a point of common potential for detecting the current flowing through the motor 3. The voltage developed across the resistor 326 is compared with a reference voltage selected for the current limit in either of positive and negative comparators 327 and 328. When the motor current is for the positive sense of rotation and tends to exceed the limit, the positive comparator 327 produces a logic "1" signal. The output signals of the comparators 327 and 328 serve to close or disable the gates 304 and 307 through a NOR gate 329 and thereby prevent the motor current from exceeding the limit.

Figure 15:
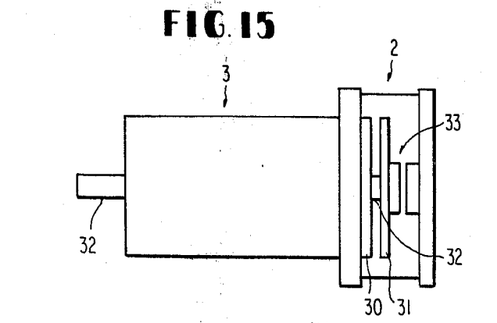
FIG. 15 shows in a schematic side view a motor and a position sensor for use in combination with the system illustrated in FIG. 2.
Figure 16:
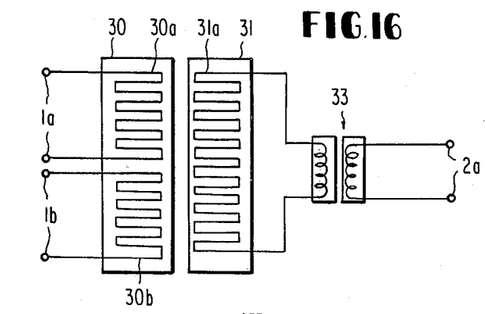
FIG. 16 shows in a schematic equivalent circuit diagram the position sensor shown in FIG. 15.

Referring to FIG. 15, the position sensor 2 attached to the motor 3 comprises a stator 30 attached to the motor frame, a rotor 31 mechanically coupled to the motor axle 32 to be rotatable with the motor 3, and a rotary transformer 33. The stator 30 comprises, as shown in FIG. 16, a first and a second primary coils or stator windings 30a and 30b which are so arranged that the winding periods are equal to each other and winding phase of one is different by 90 from that of the other, and to which the sensor driving signals 1a and 1b are applied. The rotor 31 comprises a secondary coil or a rotor winding 31a from which an induced signal is obtained by electromagnetic induction. The winding period of the rotor winding 31a is equal to that of the stator winding 30a or 30b. The position sensor 2 may be composed of the rotary "Inductosyn" (trademark) as described in the U.S. Pat. No. 3,191,010. In FIG. 16, the windings 30a, 30b and 31a are arranged in linear for simplicity. In practice, the windings of the rotary position sensor are arranged concentrically with respect to the motor axle. In case where the motor is composed of a linear motor, the windings of a linear position sensor are arranged in linear along the moving direction.

The stator windings 30a and 30b are respectively supplied with the sensor driving signals 1a and 1b of the 90°-phased sinusoidal waves having the first repetition period and a same amplitude, whereby the rotor winding induces a phase modulated signal of sinusoidal wave having the first repetition period. The phase relationship between the phase modulated signal and the sensor driving signal is proportional to the rotating angle of the rotor 31 or the motor axle 32. The induced phase modulated signal is supplied through the rotary transformer 33 to the servo system 1 as the position signal 2a.

Figure 17:
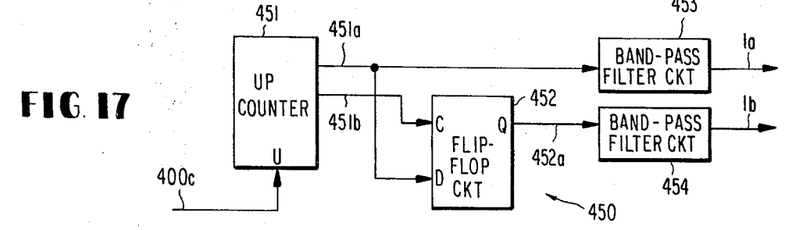
FIG. 17 is a block diagram of a sensor driver circuit used in the system illustrated in FIG. 2.
Figure 18:
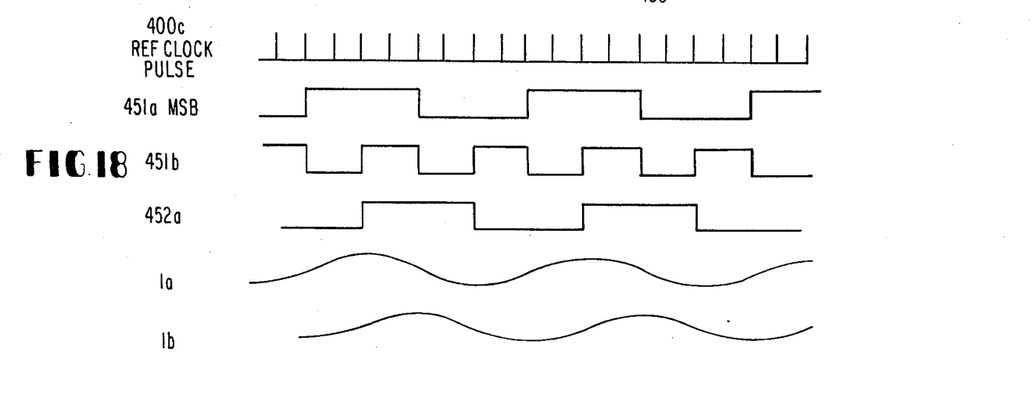
FIG. 18 is a timing chart showing several signals for describing the operation of the sensor driver circuit shown in FIG. 17.

Referring to FIG. 17, an example of the sensor driver circuit 450 comprises a up counter 451 for counting up the reference clock pulses 400c. The up counter 451 supplies the most-significant-bit signal and the secondary-significant-bit signal as the first MSB signal 451a and the second MSB signal 451b to lines 451a and 451b, respectively. The dividing rate of the up counter 451 is so selected that the repetition period, i.e., the pulse rate of the MSB signal 451a is equal to the first repetition period. The first MSB signal 451a is supplied to a data input terminal D of a flip-flop circuit 452 and sampled by the second MSB signal 451b supplied to a clock input terminal C to provide an output signal 452a having a phase different from that of the first MSB signal 451a by 90°, as shown in FIG. 18. The signals 451a and 452a are supplied to band-pass filter circuits 453 and 454 having a center frequency corresponding to the first repetition period to provide the sensor signals 1a and 1b of sinusoidal waves, respectively.

Figure 19:
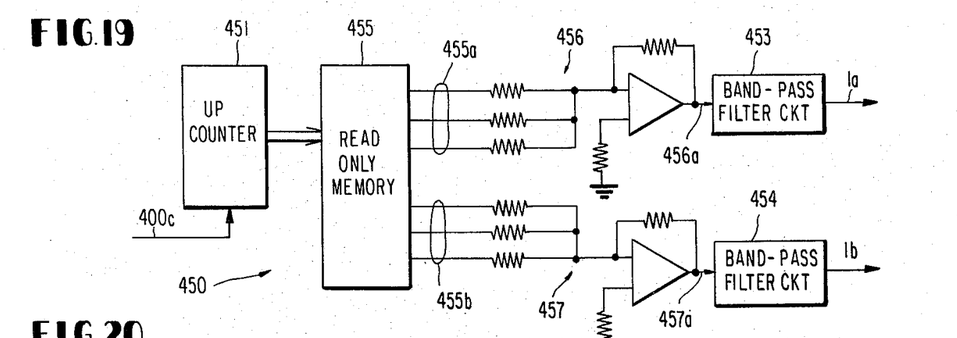
FIG. 19 is a block diagram of another sensor driver circuit for use in the system shown in FIG. 2.
Figures 20, 21, 22:
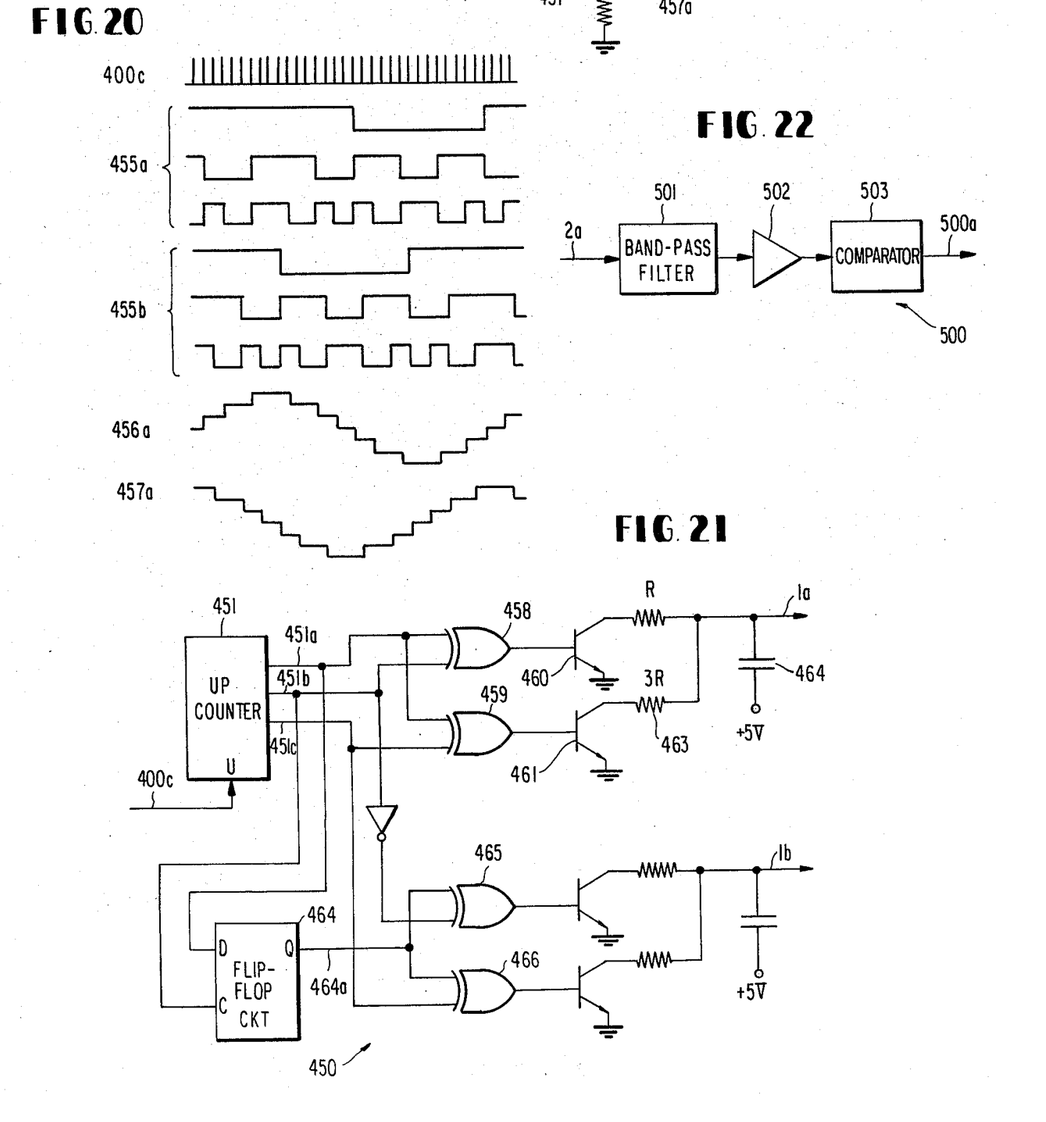
FIG. 20 is a timing chart showing several signals for describing the operation of the sensor driver circuit shown in FIG. 19.
FIG. 21 is a block diagram of still another sensor driver circuit for use in the system shown in FIG. 2.
FIG. 22 is a block diagram of an amplifier used in the system illustrated in FIG. 2.

Referring to FIG. 19, another example of the sensor driver circuit 450 comprises the up counter 451 and a read-only-memory (ROM) 455 responsive to the count signal as address data for producing a first and a second digital data 455a and 455b representative of the sinusoidal waves having the first repetition period and phases different from each other by 90°, as shown in FIG. 20. The first and the second digital data 455a and 455b are supplied to digital-to-analog converter circuits 456 and 457 to provide pulsed-sinusoidal waves 456a and 457a as shown in FIG. 19, respectively. The pulsed-sinusoidal waves 456a and 457a are supplied to the band-pass filter circuits 453 and 454 to provide the sensor driving signals 1a and 1b, respectively.

Referring to FIG. 21, the still another example of the sensor driver circuit 450 comprises the up counter 451 for supplying the first, the second and the third MSB signals to the lines 451a, 451b and 451c, respectively. The first MSB signal 451a is supplied to one input terminal of each of EXOR (exclusive OR) gates 458 and 459. The second and third MSB signals 451b and 451c are supplied to the other terminals of the EXOR gates 458 and 459, respectively. The output signals of the EXOR gates 458 and 459 are supplied to base terminals of transistors 460 and 461, whose collector terminals are connected to the line 1a through resistors 462 and 463, respectively. The line 1a is connected through capacitor 464 to a positive power supply of +5 V. The resistor 462 has a resistance of R, while the resistor 463 has 3R. With counting the reference clock pulses 400c, the line 1a leads the sinusoidal wave having the first repetition period.

The first MSB signal 451a is shifted by 90° by a flip-flop circuit 464, which is supplied at a clock input terminal C with the second MSB signal 451b. The 90°-phased signal 464a is supplied to EXOR gates 465 and 466, which are supplied with an inversed second MSB signal and the third MSB signal, respectively. The line 1b supplies the sinusoidal wave phase-shifted by 90° with respect to the sinusoidal wave 1a.

Referring to FIG. 22, an amplifier circuit 500 comprises a band-pass filter 501 having a center frequency corresponding to the first repetition period and for suppressing noise components. The output signal of the band-pass filter 501 is supplied through an amplifier 502 to a comparator 503. The comparator 503 produces the digital position signal 500a.

Figure 23:
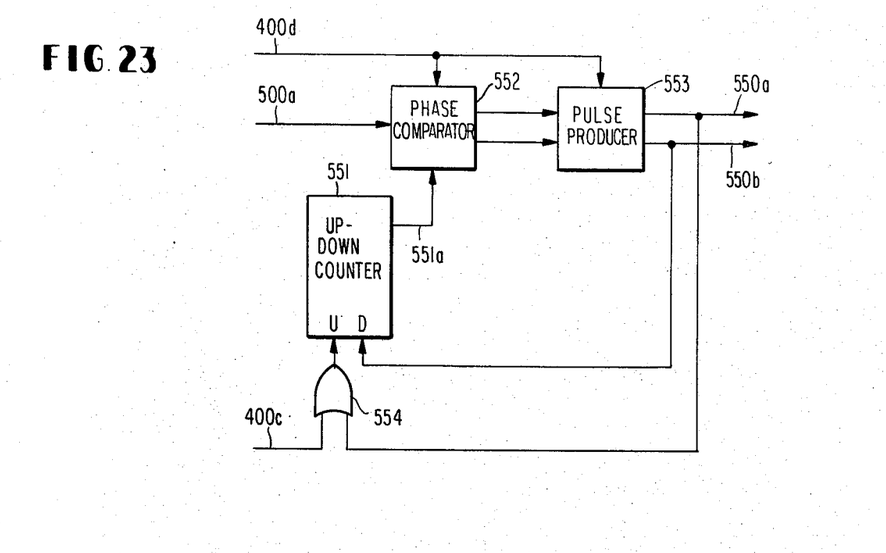
FIG. 23 is a block diagram of an incremental position pulse producer circuit used in the system shown in FIG. 2.

Referring to FIG. 23, the incremental position pulse producer circuit 550 comprises an up-down counter 551 for counting up the first reference clock pulse sequence 400c. The bit-number of the counter 551 is equal to that of the counter 451 used in the sensor driver circuit 450, whereby the counter 551 supplies an MSB signal 551a having the first repetition period.

The digital position signal 500a phase-modulated by the rotational position of the motor 3 is supplied to a phase comparator 552 and phase-compared with the MSB signal 551a supplied from the counter 551 thereto. When the phase of the digital podition signal 500a with reference to that of the MSB signal 551a is shifted by a value not less than a predetermined value, for example, one repetition period of the second reference clock pulse 400d, the comparator 552 supplies the logic signal to lines 552a and 552b in accordance with a phase advance and phase lag, respectively. The output signals 552a and 552b are supplied to a pulse producer 553 for producing the incremental position pulses 550a and 550b. The positive incremental position pulse 550a is supplied through an OR gate 554 to the up terminal U of the counter 551 to count up the count signal by one. The negative incremental position pulse 550b is supplied to the down terminal D of the counter 551 to count down the count signal by one.

As understood from the above, when the motor 3 is stopped, the phase of the MSB signal 551a is usually coincident with that of the digital position signal 500a, whereby no incremental position pulse is produced. When the motor 3 is rotating, the positive or negative incremental position pulse 550a or 550b in accordance with the rotational direction is produced every time during which the motor 3 is rotated by a predetermined rotational angle.

Figure 24:
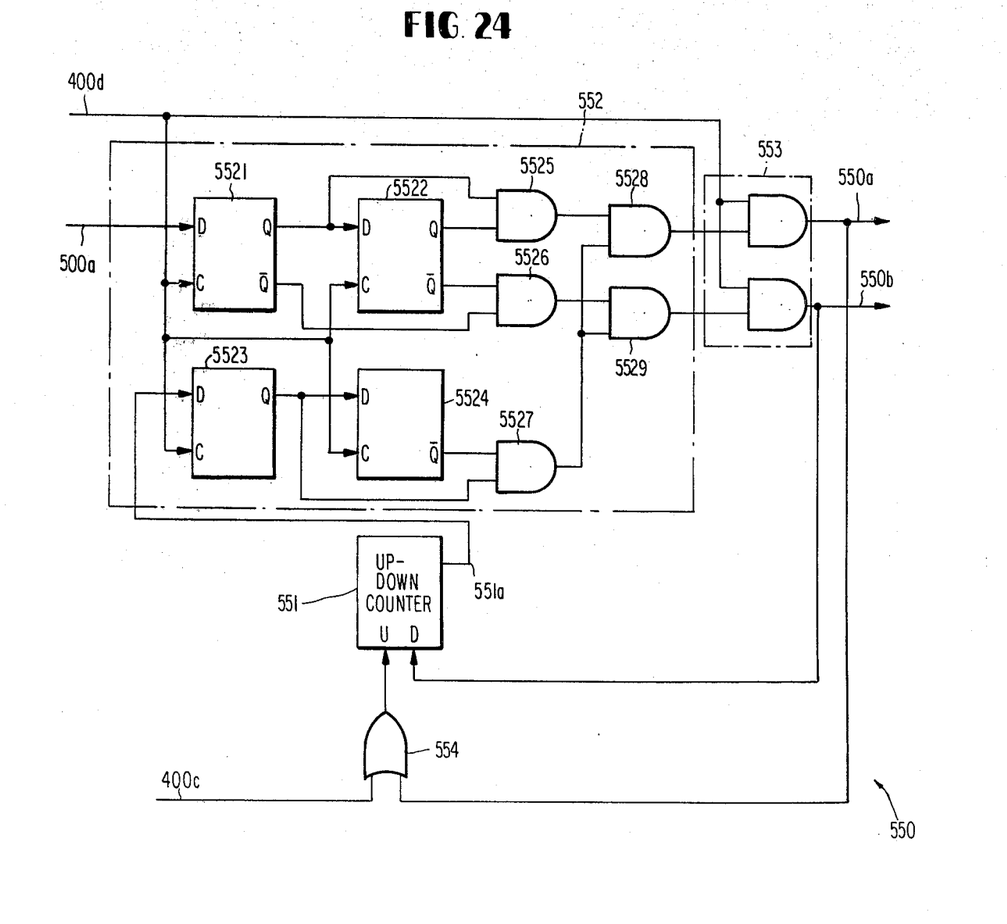
FIG. 24 is a block diagram of another incremental position pulse producer circuit for use in the system shown in FIG. 2.

Referring to FIG. 24, the phase comparator 552 is composed of four flip-flop circuits 5521 to 5524, and five AND gates 5525 to 5529. The digital position signal 500a is sampled by the second reference clock pulse 400d in the flip-flop circuits 5521 and 5522 and the AND gates 5525 and 5526 produce first and second sample signals 5525a and 5526a which are supplied to the AND gates 5528 and 5529, respectively. The MSB signal 551a is sampled by the second reference clock pulse 400d in the flip-flop circuits 5523 and 5524 and the AND gate 5527 produces a gate signal 5527a, which is supplied to the AND gates 5528 and 5529.

When the motor 3 moves in the positive sense, the digital position signal 500a is phase-advanced from the MSB signal 551a, whereby the positive incremental position pulse 550a is generated. The positive incremental position pulse 500a is supplied through the up terminal U of the counter 551 to count up by one, whereby the MSB signal becomes in phase with the digital position signal 500a. When the signals become inphase, no incremental position pulse is produced. When the motor 3 is again moved in the positive sense, and the phase difference between the digital position signal 500a and the MSB signal 551a exceeds the predetermined value, i.e., the time interval equal to one repetition period of the second clock pulse 400d, the positive incremental position pulse 550a is again produced. Conversely, when the motor 3 is moved in the negative sense, the negative incremental position pulse 550b is produced and supplied to the down terminal D of the counter 551 to count down by one, whereby the MSB signal 551a becomes in phase with the digital position signal 500a.

Figure 25:
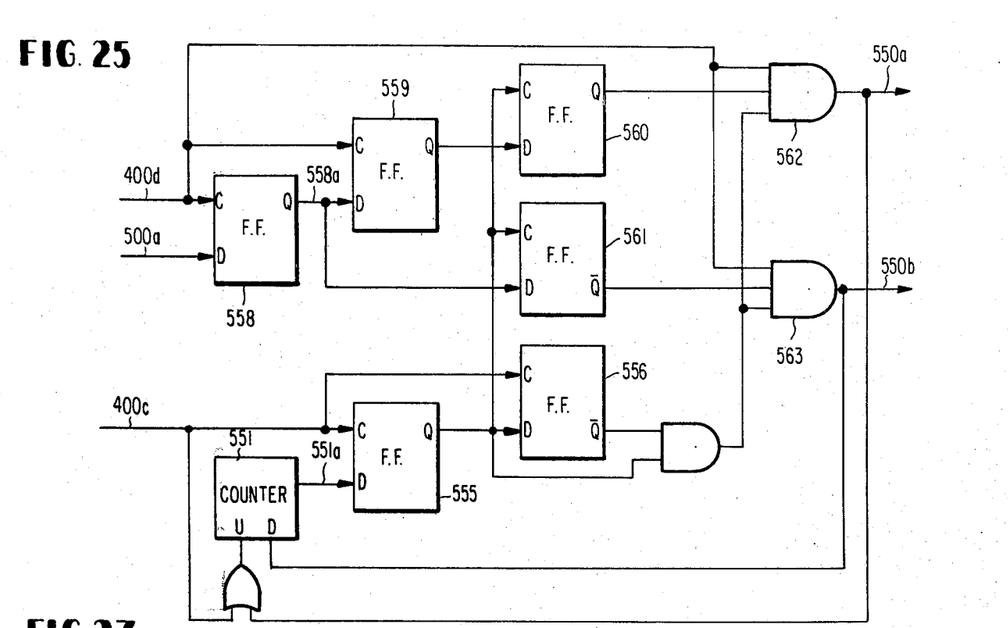
FIG. 25 is a block diagram of still another incremental position pulse producer circuit for use in the system shown in FIG. 2.

Referring to FIG. 25, the MSB signal 551a is sampled by the first reference clock pulse 400c in flip-flop circuits 555 and 556 and an AND gate 557 produces a gate pulse 557a having a pulse width equal to one repetition period of the first clock pulse 400c. The digital position signal 500a is sampled by the second reference clock pulse 400d in flip-flop circuits 558 and 559 to produce output signals 558a and 559a, respectively. The output signals 559a and 558a are sampled by the output signal 555a in flip-flop circuits 560 and 561 to produce output signals 560a and 561a, which are supplied to AND gates 562 and 563, which are supplied with the gate pulse 557a, respectively. The AND gates 562 and 563 produces the positive and negative incremental position pulses 550a and 550b when the motor 3 is moved in the positive and negative senses, respectively.

It is possible to install an additional flip-flop circuit between the flip-flop circuits 558 and 559.

Figure 26:
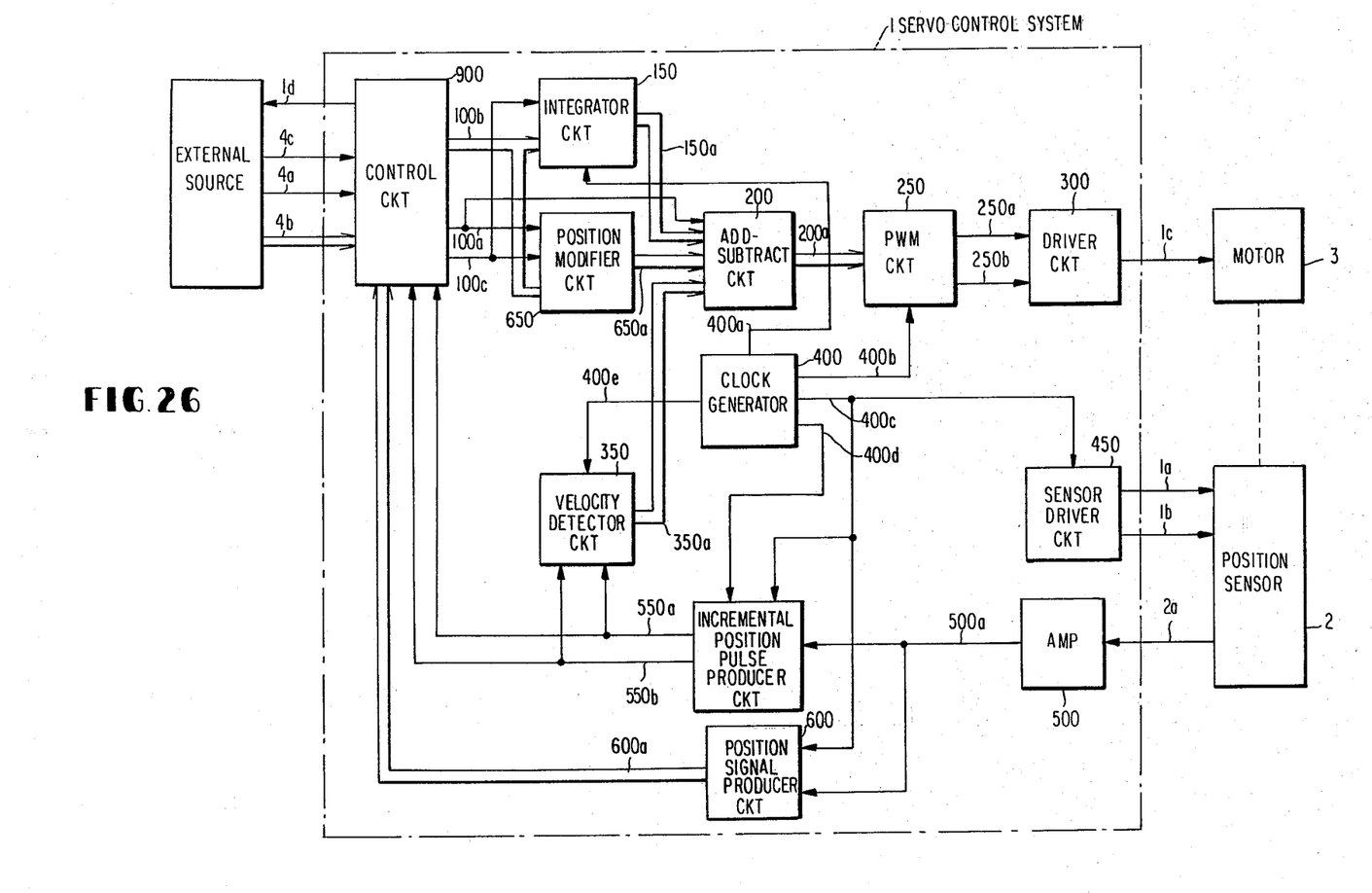
FIG. 26 is a block diagram of a servo control system according to a second embodiment of this invention, together with the motor, the command signal generator, and the position sensor.
Figure 27:
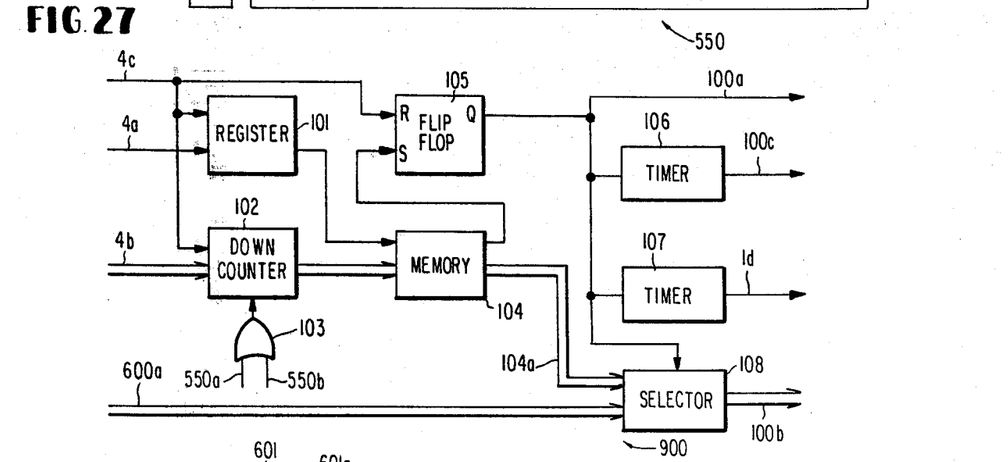
FIG. 27 is a block diagram of a control circuit used in the system illustrated in FIG. 26.

Turning to FIG. 26, a servo control system according to a second embodiment of this invention comprises similar parts designated by like reference numerals as in FIG. 2 and is operable with similar signals. The servo control system 1 further comprises a position signal producer circuit 600 responsive to the first clock pulse 400c and the digital position signal 500a for producing a position signal 600a representative of the absolute rotational position. The position signal 600a is supplied to a control circuit 900. The control circuit 900 is identical to the control circuit 100 shown in FIG. 6 except that the position signal 600a is applied to the selector 108 as the second position error signal instead of the output signal 102b of the portion 102L of the counter 102, as shown in FIG. 27.

Figure 28:
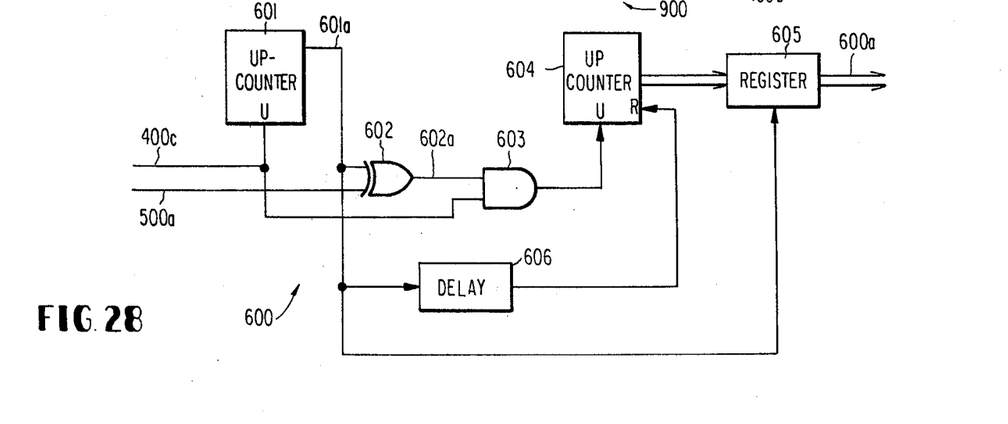
FIG. 28 is a block diagram of a position signal producer circuit used in the system shown in FIG. 26.

Finally referring to FIG. 28, the position signal producer circuit 600 comprises an up counter 601 identical to the counter 451 of the sensor driver circuit 450 and for counting up the first clock pulse 400c to produce an MSB signal 601a having the first repetition period. The phase difference between the digital position signal 500a and the MSB signal 601a is proportional to the rotational position of the motor 3. The MSB signal 601a and the digital position signal 500a are supplied to an EXOR gate 602 to produce a gate signal 602a whose pulse width is proportional to the phase difference therebetween, i.e., the rotational position. The gate pulse 602a is supplied to an AND gate 603 which is supplied with the reference clock pulses 400c. The output pulses of the AND gate 603 are supplied to an up counter 604. The count signal 604a is set in a register 605 in response to the MSB signal 601a supplied thereto. After the setting the count signal in the register 605, the counter 604 is reset by the MSB signal 601a passed through a delay circuit 606. Because the pulse width of the gate pulse 602a is proportional to the absolute rotational position of the motor 3, the register 605 supplies the position signal 600a representative of the absolute rotational position every time interval of the first repetition period.

What is claimed is:

1. A digital servo control system responsive to a command signal indicative of a commanded position of a movable element and a phase modulated position signal having a phase indicative of a present position of said movable element, for controllably driving said movable element to said commanded position, said system comprising;

incremental position pulse producing means responsive to said phase modulated position signal for producing incremental position pulses representative of a variation in said present position;

means responsive to said command signal and said incremental position pulses for producing a position error signal indicative of a displacement from said present position to said commanded position;

means for producing a mode signal indicative of a velocity control mode and a position control mode when said displacement is above and below a first predetermined value in absolute value, respectively;

means for producing a reference velocity signal selected for said movable element in consideration of said displacement;

means responsive to said mode signal for selecting as a control signal said reference velocity signal when said mode signal indicates said velocity control mode and said position error signal when said position control mode is indicated;

means for producing an integration signal when a predetermined interval of time lapses after a generation of said mode signal indicative of said position control mode;

means responsive to said integration signal for integrating clock pulses when said displacement is below in absolute value a second predetermined value less than said first predetermined value to produce an integrated value signal;

means for adding said integrated value signal to said position error signal to produce an integrated position error signal, said control signal when said integration signal exists being said integrated position error signal; and means responsive to said control signal and said position pulses for driving said movable element.

2. A digital servo control system as claimed in claim 1 wherein said reference velocity signal producing means includes storage means for outputting said reference velocity signal dependent upon said position error signal applied thereto as address data.

3. A digital servo control system as claimed in claim 1, further comprising a position signal producing circuit responsive to said phase modulated position signal for producing a position signal representing the instant position of said movable element.

4. A digital servo control system as claimed in any of claims 1, 2 or 3 comprising;

a position modifier circuit means responsive to said selecting means, said mode signal and said integration signal for providing as its output said reference velocity signal when said mode signal indicates said velocity control mode, a first modified position error signal dependent upon said position error signal during said prescribed interval, and a second modified position error signal dependent upon said position error signal when said integrating means is operative, said second modified position error signal having a dead zone.

5. A digital servo control system as claimed in claim 4, wherein said moveable element driving means comprises a velocity detector responsive to said incremental position pulses for producing a velocity signal indicative of the sense and magnitude of the velocity of said moveable element.

6. A digital servo control system as claimed in claim 5 wherein said moveable element driving means further comprises a subtractor means for subtracting from said control signal said velocity signal multiplied by a first factor during said velocity mode signal and a second factor during said position mode signal, and means for multiplying the output of said subtractor means by a first factor during said velocity mode signal and a second factor during said position mode signal to provide a subtractor output signal.

7. A digital servo control system as claimed in claim 6 wherein said moveable element driving means further comprises, a pulse width modulation circuit responsive to said subtractor output signal for producing a pair of opposite polarity pulses having a duty cycle dependent upon said subtractor output signal, and driver circuit means responsive to said opposite polarity pulses for driving said motor in a direction and at a velocity to reduce the calculated displacement to zero.

* * * * *

UNITED STATES PATENT AND TRADEMARK OFFICE
CERTIFICATE OF CORRECTION

PATENT NO. : 4,313,074

DATED : January 26, 1982

INVENTOR(S) : Tadashi Nomura et al

It is certified that error appears in the above—identified patent and that said Letters Patent is hereby corrected as shown below:

Column 5, line 23 - delete one of "a";

Column 5, line 55 - change "primarilly" to --primarily--;

Column 5, line 67 - change "modultor" to --modulator--;

Column 6, line 38 - delete "of";

Column 7, line 49 - change "105a" to --150a--;

Column 13, line 64 - change "podition" to --position--;

Column 14, line 37 - change "500a" to --550a--.

Signed and Sealed this

Thirteenth Day of April 1982

[SEAL]

Attest:

Attesting Officer

GERALD J. MOSSINGHOFF

Commissioner of Patents and Trademarks